United States Patent [19]

Pelsy

[11] Patent Number: 4,643,615
[45] Date of Patent: Feb. 17, 1987

[54] PROCESS AND DEVICE FOR OBTAINING DATA RELATIVE TO THE POSITION IN A VERTICAL PLANE OF A SUPPLE PIPE IN THE PROCESS OF BEING BURIED

[76] Inventor: Gilles Pelsy, 47 rue Benard, 75014 Paris, France

[21] Appl. No.: 773,108

[22] Filed: Sep. 6, 1985

Related U.S. Application Data

[63] Continuation of Ser. No. 458,558, Jan. 17, 1983, abandoned.

[30] Foreign Application Priority Data

Jan. 22, 1982 [FR] France ................................. 82 01005

[51] Int. Cl.$^4$ .............................. E02F 5/10; F16L 1/02
[52] U.S. Cl. ...................................... 405/175; 405/180
[58] Field of Search ............... 405/160, 168, 174, 175, 405/177, 180; 33/365

[56] References Cited

U.S. PATENT DOCUMENTS

| | | | |
|---|---|---|---|
| 3,559,415 | 2/1971 | Vaughan et al. | 405/175 |
| 4,031,709 | 6/1977 | Blankemeyer | 405/175 X |
| 4,150,911 | 4/1979 | Droste et al. | 405/177 |
| 4,244,123 | 1/1981 | Lazure et al. | 405/175 X |
| 4,293,238 | 10/1981 | Kuzin et al. | 405/175 |

FOREIGN PATENT DOCUMENTS

| | | | |
|---|---|---|---|
| 524828 | 8/1940 | United Kingdom | 405/160 |
| 524829 | 8/1940 | United Kingdom | 405/160 |

Primary Examiner—David H. Corbin
Attorney, Agent, or Firm—Fisher, Christen & Sabol

[57] ABSTRACT

The present invention relates to a process for determining the position in a substantially vertical plane of a supple pipe, such as a drain, in the course of being buried in the ground at the bottom of a trench by a working tool. According to the invention, this process is characterized in that the inclination of at least one sensor element connected to the tool is continuously detected, said inclination being indicative of the gradient of the increment of section of supple pipe which has just been laid in the bottom of the trench. The invention is applicable to the laying of drains in trenches.

13 Claims, 9 Drawing Figures

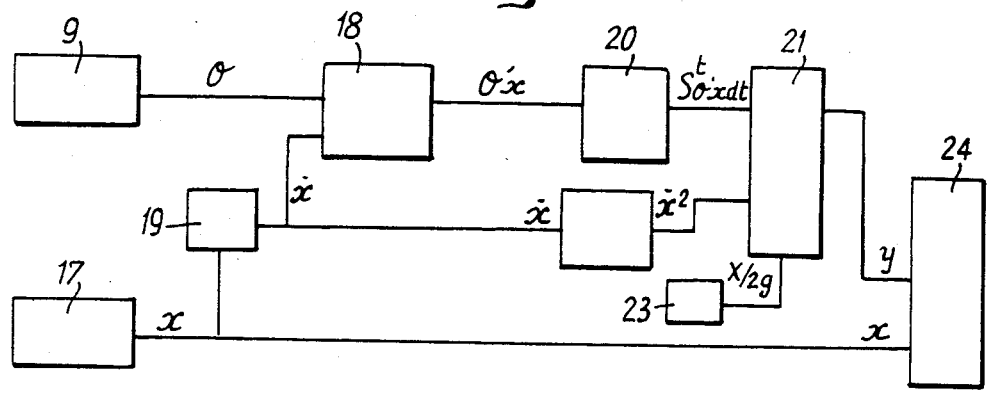
Fig:6
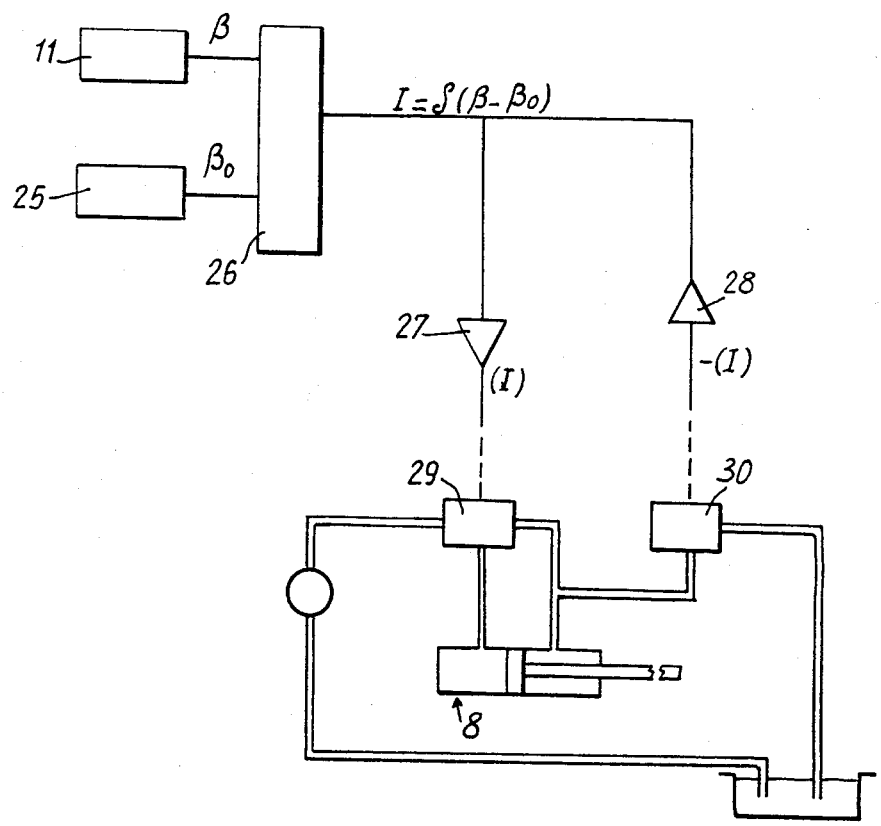
Fig:7

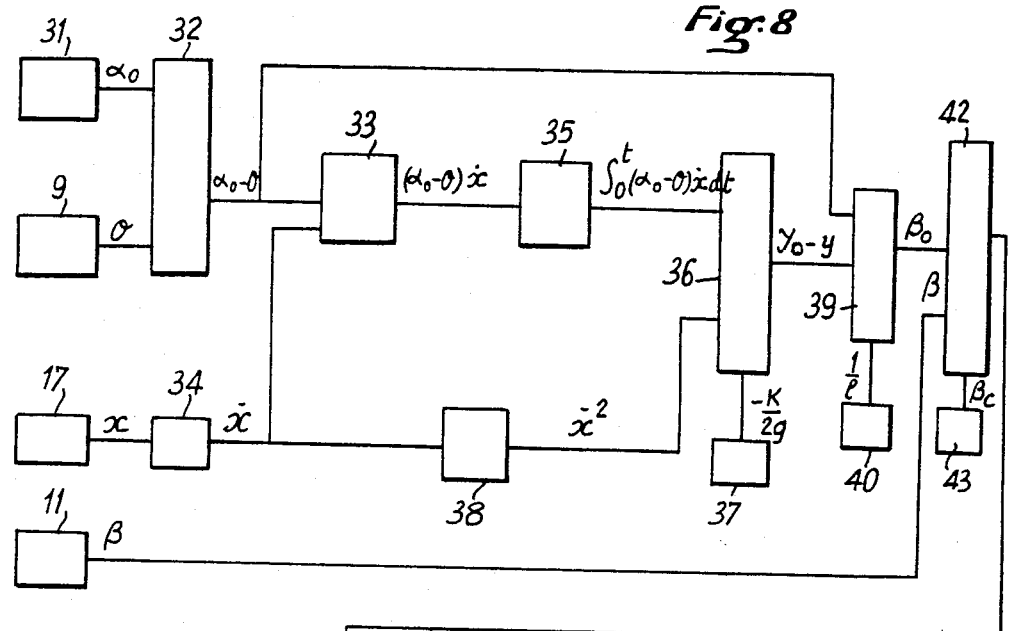
Fig. 8
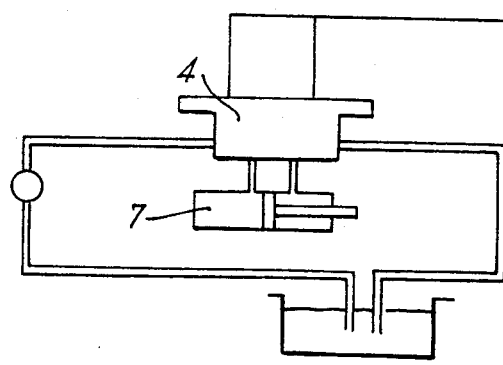
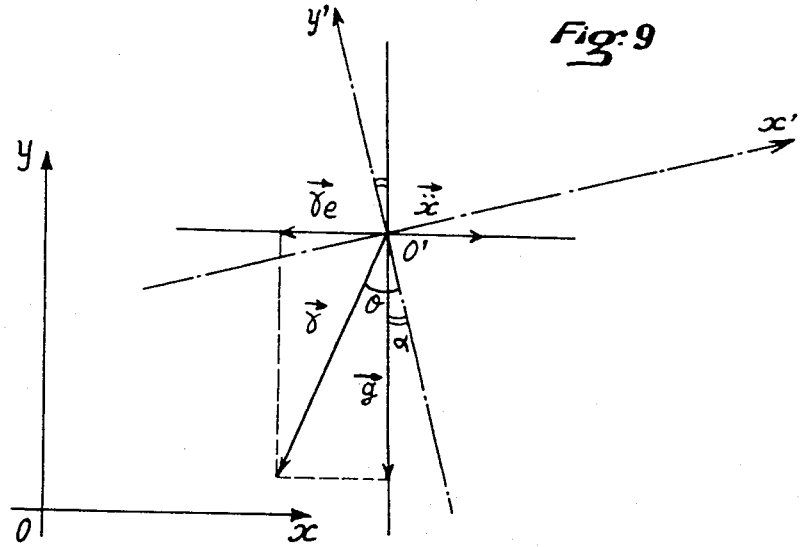
Fig. 9

PROCESS AND DEVICE FOR OBTAINING DATA RELATIVE TO THE POSITION IN A VERTICAL PLANE OF A SUPPLE PIPE IN THE PROCESS OF BEING BURIED

This application is a continuation of application Ser. No. 458,558, filed Jan. 17, 1983, now abandoned.

The present invention relates to a process and device for obtaining data relative to the position in a vertical plane of a supple pipe, such as a drain, in the course of being buried in the ground by a working tool, and/or the position of said working tool.

Known devices for burying a supple pipe at the bottom of a trench present the drawback of leaving considerable uncertainty as to the position, particularly the instantaneous position, of the drain being buried and the position of the tool relatively to said drain, and in particular the instantaneous gradients of the drain and the wokring tool with respect to the ground.

In addition, known devices do not enable the bearing pressure exerted on the tool by the machine supporting or pulling said tool, to be adjusted with precision as a function of the ground and the profile of the tool.

Moreover, it is not possible to know the path effectively followed by the drain and in particular its gradient. This information is known to be primordial since the efficiency of a drain is largely due to expected and imposed gradients being respected.

It is an object of the present invention to overcome these drawbacks and it relates to a process for obtaining, by measurements and calculations, the data necessary for determining the important parameters concerning the conditions of advance of the tool and of laying of a supple pipe in the bottom of a trench. The device for carrying out the process according to the invention also enables said conditions to be realized to best advantage.

To this end, according to the invention, the process for determining the position in a substantially vertical plane of a supple pipe, such as a drain, in the course of being buried in the ground at the bottom of a trench by a working tool, is characterized in that the inclination of at least one sensor element connected to the tool is continuously detected, said inclination being indicative of the gradient of the increment of section of supple pipe which has just been laid at the bottom of the trench.

The invention also relates to a device for carrying out the process according to the invention, comprising a sensor member of which the inclination is indicative of the gradient of the increment of section of supple pipe laid, and a member for measuring this inclination, such as an inclinometer.

The invention will be more readily understood on reading the following description with reference to the accompanying drawings, in which:

FIG. 1 schematically shows in side view the device according to the invention applied to the burying of a drain with the aid of a working tool pulled by a machine rolling over the ground.

FIGS. 6, 7 and 8 are block functional diagrams of the measuring and calculating means associated with the measuring means.

FIG. 9 is a theoretical diagram showing the angular connections between the different accelerations to which the inclinometer is subjected.

Figure 1:
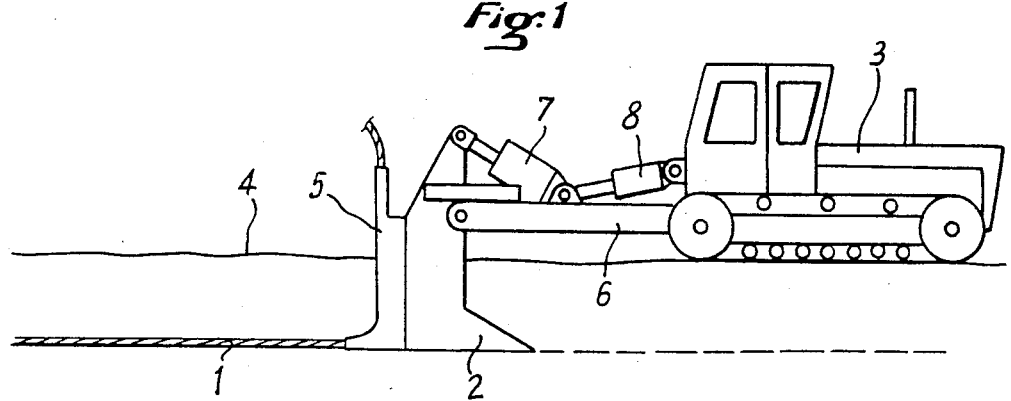

Referring now to the drawings, FIG. 1 shows an example of application of the device to the burying of a drain 1 with the aid of a working tool 2 supported and pulled by a machine 3 rolling over the ground 4. The tool 2 is constituted by a tooth adapted to hollow out a trench in the ground and comprises means 5 for guiding the drain 1 so that the latter is buried at the bottom of the opened trench. The tooth 2 is articulated on a frame 6 and is adapted to pivot due to the action of a jack 7. The frame 6 may itself pivot about a shaft connected to said machine 3 via a jack 8. By adjusting the two jacks 7 and 8, the position of the tooth 2 and the bearing pressure exerted by the machine 3 on the tooth 2 may be adjusted.

In FIG. 1, for clarity's sake, frame 6, tooth 2 and jacks 7, 8 have been shown enlarged with respect to machine 3.

Figure 2:
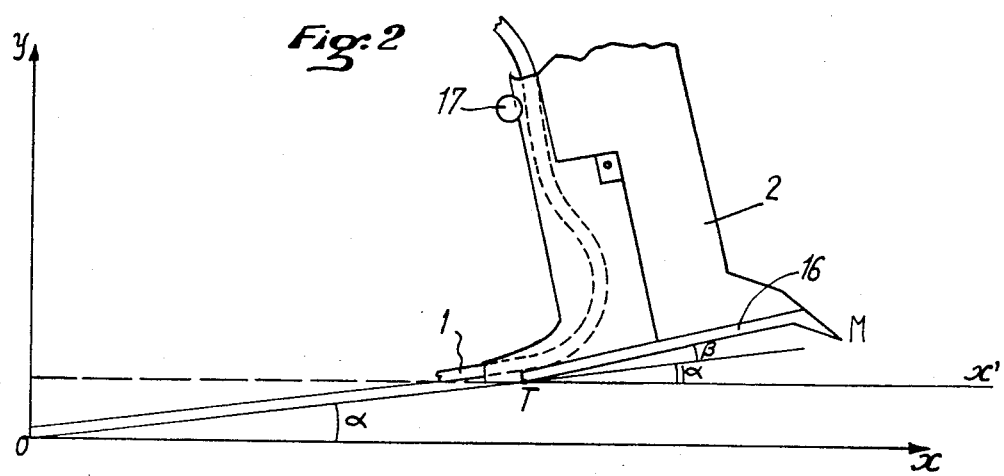
FIG. 2 is a schematic side view showing the relative inclinations of the drain and the tool during operation.

FIG. 2 shows a system of fixed axes O, x, y in which the cutting tooth 2 moves in translation parallel to itself along axis Ox towards the right in the Figure. As it advances, tooth 2 buries a supple drain 1 which unwinds in the rear part of the tooth and opens out therefrom parallel to the bottom of the opened trench.

The section of buried drain 1 makes an angle $\alpha$ with the horizontal T, x' (parallel to O,x). The base of the tooth itself makes an angle $\beta$ with the direction of the section of buried drain 1.

These angles $\alpha$ and $\beta$ may be measured by the device according to the invention with the aid (cf. FIG. 3) respectively of an inclinometer 9 and a proximity detector 11, both associated with a sensor member 10. The latter is adapted to pivot about a pin 12 transverse to the advance of the tooth 2 and disposed at the rear end thereof. The front part 13 of the sensor member 10 supports the inclinometer 9, whilst its rear part 14 projects beyond the rear of the tooth 2 and rests on the bottom of the trench opened by the tool, whilst supporting the section of drain 1 projecting beyond said tool 2. A return spring 15, fast by its ends with the tooth 2 and the end of the front part 13 of the sensor member 10, maintains the rear part 14 applied against the bottom of the trench, by the lever effect. In this way, the inclination of the increment of the section of drain which has just been laid is represented by the inclination of the sensor member 10. Consequently, any variation in gradient of the bottom of the trench and therefore of the section of drain 1 is translated by a rotation of the sensor member 10 about its axis 12, the amplitude of which is measured by the inclinometer 9. The value of angle $\alpha$ made by the increment of section of laid drain 1 with the horizontal, i.e. the gradient of the latter, may then be known.

Figure 3:
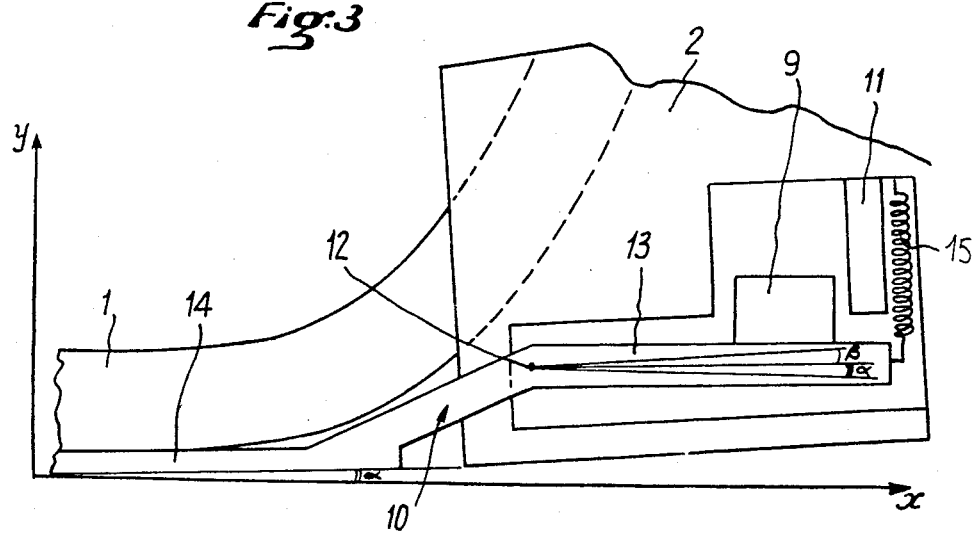
FIG. 3 is a schematic enlarged view of the rear end of the tool provided with an embodiment of the device according to the invention.

Similarly, the relative inclination, represented by the angle of the sensor member 10 (i.e. of the laid drain 1) and of the tooth 2 is measured due to the proximity detector 11 (connected to the tooth 2 according to the embodiment shown in FIG. 3). The end of the front part 13 of the sensor member 10 moves away or comes towards it depending on the relative angular variations of the tooth 1 and the sensor member 10.

Figure 4:
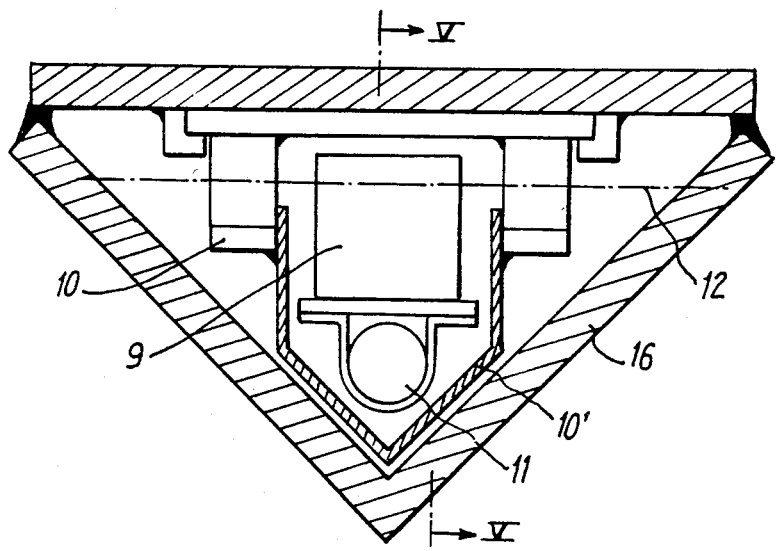
FIG. 4 is a schematic view in partial transverse section along line IV—IV of FIG. 5, showing an embodiment of the device according to the invention arranged in a working tool.
Figure 5:
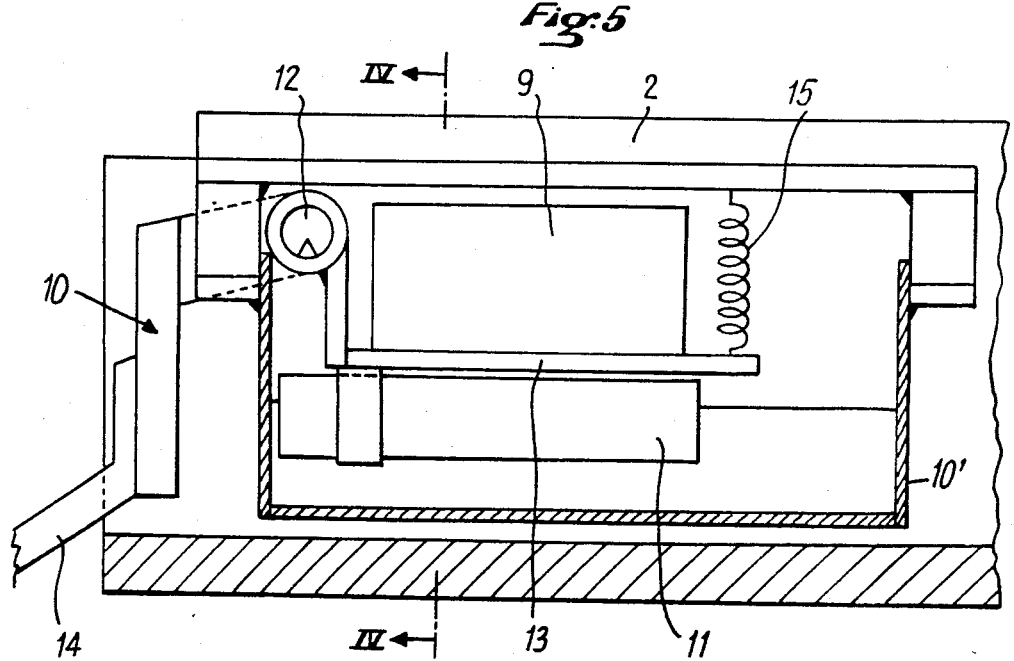
FIG. 5 is a schematic view in partial longitudinal section along line V—V of FIG. 4.

FIGS. 4 and 5 show an embodiment of the device, the latter being disposed in the V-shaped base 16 of the tooth 2. The proximity detector 11, in cylindrical form, is disposed beneath the front part 13 of the sensor member 10. This variant (FIG. 4) according to which the detector 11 is face with the sensor member 10, is preferred to the one where this same detector is fast with the tooth 2 (FIG. 3). The assembly formed by the inclinometer 9, the proximity detector 11 and the front part 13 of the sensor member 10 pivots about the axis 12 inside an envelope 10'.

The members shown in the embodiment shown in FIGS. 4 and 5 perform the same functions as those described in FIGS. 2 and 3.

The process according to the invention and the device for carrying it out, of which embodiments have just been described, can be applied in several ways, three applications being set forth hereinafter.

A first application of the process according to the invention lies in the possibility of knowing and recording the instantaneous y-axis of the laid drain as a function of the x-axis. This information is particularly interesting as it makes it possible to check whether the instantaneous gradient of the laid drain is in accordance with the expected gradient, and in particular to detect possible reverse gradients of said drain, detrimental to correct functioning thereof.

To this end, the information given by the inclinometer 9 may be used directly. The different values of the gradient measured represent the successive gradients of the increments of section of laid drain.

There is therefore a succession of values of gradients for each increment of length of laid drain. At each instant, the gradient $\alpha$ is equal to the derivative $$\frac{dy}{dx},$$

so that, by integration on a path of length x (measured for example by a roller 17 determining the length of drain wound off), the y-axis may be obtained by the integral $y = \int_0^x \alpha \cdot dx$, and therefore the gradient equal to y/x.

The instantaneous gradient of the laid drain corresponding to the increment of laid section may thus be known. The x-axis and y-axis of the drain 1 may be recorded, as well as the successive gradients of the laid drain.

This method of calculating the gradient of the sections of laid drain, for a given length, is satisfactory. However, the use of an inclinometer for measuring the angle (i.e. the gradient) causes a slight difference to appear between the measured angle $\theta$ and the real angle $\alpha$. In fact, the inclinometer 9 is sensitive only to accelerations, independently of the nature of these accelerations. The measured value $\theta$ is therefore subjected to the influence of the acceleration of gravity $\vec{g}$, and in fact represents the angle made by the total acceleration $\vec{\gamma} = \vec{g} - \vec{\ddot{x}}$ with the drain ($\vec{\ddot{x}}$ being the inherent acceleration of the device in the fixed reference xOy). Let tan $(\theta - \alpha) = -\ddot{x}/g$, assuming that $\alpha$ is small. Due to the low value of the angles, the following approximation may be made: tan $(\theta - \alpha) \simeq \tan \theta - \tan \alpha$; $\alpha = \theta + \tan^{-1} \ddot{x}/g$ is then obtained and, assuming $\tan^{-1} \ddot{x}/g \simeq \ddot{x}/g$, the following value is attained: $\alpha = \theta + \ddot{x}/g$ (formula 1). Now, it is known that, by definition of the gradient, $$\frac{dy}{dx} = \alpha.$$

It may therefore be written that $y = \int_0^t \alpha \dot{x} dt$ (formula 2) where $\dot{x}$ is the first derivative of x with respect to time. In this way, knowledge of x, length of drain laid, and of $\theta$, is sufficient to determine the y-axis of the drain which, by combining formulae 1 and 2, therefore has the value $$y = \int_0^t \theta \dot{x}\, dt + \frac{K}{2g} \dot{x}^2 \qquad \text{(formula 3)}$$

where k is a coefficient introduced to take into account the approximation $\ddot{x}/g \simeq \tan^{-1} \ddot{x}/g$. The angle $\theta$ is given by the inclinometer 9, the x-axis by the member 17; the y-axis and, from there, the gradient of the drain, may be calculated by formula 3.

FIG. 6 is a block diagram showing the processing of the data measured and calculated according to the first application described hereinabove, taking into account the correction due to the acceleration of gravity g.

The inclinometer 9 gives the value of the angle $\theta$ measured which is introduced into a multiplier 18 of which the other input receives the value of the derivative $\dot{x}$ of x obtained by the derivative circuit 19 from the value x given by the roller 17. An integrator 20 is connected to the first input of an adder 21 of which the second input receives the value of $\dot{x}^2$ coming from a multiplier 22. The output of the adder 21 gives the value of y (according to formula 3). The constant generator 23 introduces the value of $$\frac{K}{2g}$$

into the adder 21.

The values of y and x are recorded and displayed by the member 24 which comprises a divider adapted to calculate the gradients y/x of the sections of drain.

A second application of the process according to the invention is the automatization of the adjustment of the bearing pressure applied on the tooth 2 by the machine 3 pulling and supporting said tooth. In fact, to stabilize the tooth in the ground, part of the weight of the machine 3 is generally transferred onto the working tool. This bearing pressure must be adjusted as a function in particular of the nature of the ground and the profile of the tool. For given ground and tool, there are therefore optimal inclinations, respectively, of the gradient of the drain and of the working tool with respect to the horizontal, and more particularly, the difference between these two angles corresponds to a constant value $\beta_o$. Now, this difference is precisely equal, by definition, to angle $\beta$. In this way, a comparison of angle $\beta$, measured at each instant by the proximity detector 11, and of the constant $\beta_o$ (fixed once and for all at the beginning of the works) makes it possible indirectly to act on the bearing force exerted by the machine on the working tool. The difference between the constant $\beta_o$ and the measurement $\beta$ will be used for actuating members, such as electrovalves, adapted to act on the hydraulic circuit connected to the jack 8 (FIG. 1) in order to reduce or increase said bearing pressure of the machine on the tool.

FIG. 7 shows a block diagram corresponding to the second application and showing the proximity detector 11 and the constant generator 25 giving, respectively, the values of $\beta$ and $\beta_o$ introduced thereafter in a control generator 26 generating a signal I, function of the difference $(\beta - \beta_o)$. The output of said generator 26 is connected (by two diodes 27 and 28 in inverted position with respect to each other), to members 29 and 30 such as hydraulic pressure limiters connected to the hydraulic circuit controlling the jack 8. As a function of the value of the difference between $\beta$ (measured value) and $\beta_o$ (imposed value), the jack 8 is actuated in one direction or the other, modifying the bearing force of the machine on the working tool.

A third application of the device is the guiding of the working tool in the ground. The principle of this type of tool implies that the heel passes in the wake of tip M placed at the front of the tool. In this way, by guiding the tip of the tool, the heel is guided. It is therefore of highest interest for this adjustment to know the position of this tip M and in particular its y-axis Y. Let l be the length separating the heel (shown by T in FIG. 2) and the tip M. The theoretical y-axis $Y_o$ which would be desirable to give to tip M, is $Y_o = y_o + l\alpha_o$ where $y_o$ and $\alpha_o$ are the reference values respectively of the y-axis of T (therefore of the drain on leaving the tool) and of the gradient of the laid drain 1. The real value Y of the y-axis of M is in fact $Y = y + l(\alpha + \beta)$, where y is the real y-axis of 0 (therefore of drain on leaving the tool). Now, it is desired to obtain $Y = Y_o$; this equality is possible only for an angle $\beta$ equal to a reference value $\beta_o$;

$$\beta_o = \frac{1}{l}(y_o - y) + (\alpha_o - \alpha)$$

is then obtained.

In this way, the reference value $\beta_o$ may be determined by knowing on the one hand the instantaneous y-axis of the section of laid drain, and therefore the position of the heel of the tooth, and, on the other hand, the instantaneous gradient of the section of drain laid.

By taking as approximate value of $\alpha$ the value $\theta$ measured by the inclinometer 9, and by combining with formula 3 mentioned hereinabove allowing calculation of y after correction due to the influence of gravity on the inclinometer, the following is obtained (formula 4):

$$\beta_o \frac{1}{l} \int_0^t (\alpha_o - \theta) \dot{x} \, dt - \frac{1}{2g} \frac{K \dot{x}^2}{l} + (\alpha_o - \theta)$$

where g, l, $\alpha_o$ and K are given, and $\theta$ and x measured.

In fact, the measured value $\beta$ must be weighted by a reference value $\beta_c$ taking into account the geometry of the tooth. This value $\beta_c$ may be different from the reference value given in the description of the second application.

By comparing $(\beta + \beta_c)$ and $\beta_o$ (calculated by formula 4), the instantaneous position of the tip M may be adjusted with high precision.

This third application of the process makes it possible, indirectly, to compare the instantaneous gradient of sections of laid drain with the reference gradient imposed on said section.

The block diagram of FIG. 8 shows the processing and calculation of the data according to the example described previously corresponding to the third application of the process.

The value $\theta$ measured by the inclinometer 9 and the reference value $\alpha_o$ given by the constant generator 31 are introduced into the differentiator 32 whose output is connected to the multiplier 33 receiving on its other input the value x coming from the derivative circuit 34. The value $(\alpha_o - \theta)$ x is then introduced into the integrator 35 of which the output is connected to the differentiator 36. This latter then receives the values of $$\frac{K}{2g}$$

and $x^2$ coming respectively from the constant generator 37 and the multiplier 38. A multiplier-adder 39 receives the values $\alpha_o - \theta$, $1/l$ (issuing from the constant generator 40) and $Y_o - y$ and calculates the value $\beta_o$ obtained in this way by formula 4. The control comparator 42 receives the values $\beta_o$, $\beta$ (coming from the proximity detector 11) and $\beta_c$ (issuing from the constant generator 43). The output signal from comparator 42 is introduced into a servo-valve 44 with proportional action, connected to the hydraulic pressure circuit of the machine. According to the relative value $\beta + \beta_c - \beta_o$, the hydraulic liquid is injected into one or the other of the chambers of the jack 7, adapted to control the orientation of the tooth with respect to the frame.

FIG. 9 shows the angular connections between the different forces to which the inclinometer is subjected. Reference xOy is fixed and connected to the ground, whilst reference x'O'y' is connected to said inclinometer. The angle $\alpha$ is the angle made by the axis O'x' and the horizontal (parallel to Ox). The angle $\theta$ measured in fact represents the angle between the total acceleration $\vec{\gamma}$ with the vertical of the reference connected to the drain, i.e. O'y'. $\vec{\gamma}_e$ is the drive force in the reference x'O'y' and $\ddot{x}$ the acceleration of the machine along the axis Ox of the fixed axis xOy. By definition, $\vec{\gamma} = \vec{g} + \vec{\gamma}_e$, now $\vec{\gamma}_e = -\vec{x}$, hence $\vec{\gamma} = \vec{g} - \vec{x}$. In this way, tan $$(\theta - \alpha) = \frac{\gamma_e}{g} = -\frac{\ddot{x}}{g}$$

is obtained, and, according to the calculations made previously, $$\alpha = \theta \frac{\ddot{x}}{g}$$

and formula 3 are attained, giving the value of the y-axis of the drain.

What is claimed is:

1. A device for determining the position in a substantially vertical plane of a supple pipe which is being buried in the ground at the bottom of a trench by a working tool, comprising a sensor member constituted by an arm articulated substantially at its center on the rear end of the tool, a rear part of said arm projecting beyond the tool by a length representing an increment of the section of the pipe which has just been buried, resting on the bottom of the trench and providing a support for said section of the pipe, while a front part of said arm is associated with a member for measuring the inclination, the inclination of said sensor member being indicative of the gradient of the increment of said section of supple pipe, each section of laid pipe having an x-axis parallel to said laid pipe and a y-axis which is transverse to said x-axis and lies in a generally vertical plane, means for calculating said y-axis of the increments of the section of laid pipe as a function of said x-axis, means for calculating the instantaneous gradients of said increments and means for recording and displaying the data calculated and measured, whereby the inclination of said sensor member connected to the tool can be continuously detected.

2. A device as claimed in claim 1 wherein the supple pipe is a drain pipe.

3. A device as claimed in claim 1, further comprising a means for measuring the length x of the buried supple pipe, said means for measuring the length x being adapted to effect a necessary correction due to the sensitivity of the inclinometer to gravity, and including a derivative circuit to calculate a second derivative $\ddot{x}$ and a means for calculating a real angle of the buried drain with respect to the horizontal T, x' with respect to the measured angle.

4. A device as claimed in claim 3 wherein said means for measuring the length x of the buried supple pipe is a roller.

5. A device as claimed in claim 1 or claim 3 further comprising a measuring means associated with said sensor member adapted to measure the angle made by the working tool with said sensor.

6. A device as claimed in claim 5 wherein said measuring means is a proximity detector.

7. A device as claimed in claim 5 wherein the device further comprises a calculating means for comparing the value of the angle measured with a given reference value $\beta_o$ as a further function of the profile of the tool and of the nature of the ground, and actuating means adapted to modify the bearing pressure exerted on said tool as a function of the difference between the measured value $\beta$ and the reference value $\beta_o$.

8. A device as claimed in claim 5 further comprising a return member, making it possible constantly to oblige the sensor member to follow the section of the bottom of the trench which has just been opened.

9. The device as claimed in claim 8 wherein said return member is a spring.

10. A device as claimed in claim 1 wherein the device also comprises a return member, making it possible constantly to oblige the sensor member to follow the section of the bottom of the trench which has just been opened.

11. A device as claimed in claim 10 wherein the return member is a spring.

12. A device as claimed in claim 1 wherein the member for measuring the inclination is an inclinometer.

13. A device as claimed in claim 1 further comprising a means for moving said device, said means for moving said device being positioned on terra firma.

* * * * *